United States Patent [19]

Donaldson

[11] Patent Number: 4,471,916

[45] Date of Patent: Sep. 18, 1984

[54] APPARATUS FOR TREATING LIQUID AND SEMI-SOLID ORGANIC WASTE MATERIALS

[75] Inventor: David L. Donaldson, New Orleans, La.

[73] Assignee: Chemfix Technologies, Inc., Kenner, La.

[21] Appl. No.: 413,025

[22] Filed: Aug. 30, 1982

[51] Int. Cl.³ ...................... B02C 23/22; B02C 18/40
[52] U.S. Cl. ........................................ 241/42; 241/60; 241/101 B; 241/159; 241/101 D; 210/173
[58] Field of Search .................. 241/22, 3, 60, 34, 41, 241/42, 46.02, 46.11, 97, 101.2, 158, 159, 98, 101 B, 101 D; 210/173

[56] References Cited

U.S. PATENT DOCUMENTS

| 2,246,224 | 6/1941 | Streander | 210/173 |
|---|---|---|---|
| 2,333,246 | 11/1943 | Harris | 241/98 X |
| 2,570,042 | 10/1951 | West | 259/104 |
| 2,600,408 | 6/1952 | Komarek | 259/6 |
| 2,745,643 | 5/1956 | Kleinlein | 259/104 |
| 2,917,395 | 12/1959 | Csanyi | 106/122 |
| 3,111,304 | 11/1963 | Bridger et al. | 259/6 |
| 3,244,408 | 4/1966 | Brownlie et al. | 259/6 |
| 3,314,614 | 4/1967 | Daniel et al. | 241/34 X |
| 3,506,201 | 4/1970 | Engels et al. | 241/42 |
| 3,837,872 | 9/1974 | Conner | 106/74 |
| 3,893,656 | 7/1975 | Opacic et al. | 259/7 |
| 3,904,131 | 9/1975 | Farrell, Jr. et al. | 241/46.02 |
| 3,938,744 | 2/1976 | Allen | 241/46.11 |
| 3,941,357 | 3/1976 | Wurtz | 259/104 |
| 4,036,477 | 7/1977 | Sieradzki et al. | 259/104 |
| 4,176,969 | 12/1979 | Wallace et al. | 366/149 |
| 4,234,259 | 11/1980 | Wiedmann et al. | 366/81 |
| 4,281,934 | 8/1981 | Krause et al. | 366/30 |
| 4,416,394 | 11/1983 | Gelfand et al. | 241/34 X |

FOREIGN PATENT DOCUMENTS

| 938399 | 1/1956 | Fed. Rep. of Germany | 241/98 |
|---|---|---|---|
| 741403 | 11/1955 | United Kingdom | 241/98 |
| 421365 | 12/1974 | U.S.S.R. | 241/34 |

Primary Examiner—Mark Rosenbaum
Assistant Examiner—Joseph M. Gorski
Attorney, Agent, or Firm—Biebel, French & Nauman

[57] ABSTRACT

An apparatus and method for treating for disposal organic waste material carried within a sludge, by adding to the sludge an alkali metal silicate and a setting agent, is disclosed. The apparatus includes several mixers, each having a trough with an input end and a discharge end, at least one rotatable shaft mounted longitudinally along the trough, a plurality of blades mounted to the shaft, and a drive for rotating the shaft. The sludge is deposited within a first mixer, and then directed from the mixer into a tank. A series of chopper pumps recirculate the sludge into the tank, and alternatively, the sludge may be passed through an additional mixer. Leaving the tank, the sludge is directed into a second mixer at its input end. Water is introduced at the input end, and a setting agent is added along the trough at a point adjacent the input end. Further along the trough, an alkali metal silicate is introduced. The mixture is recovered from the second mixer, and carried to a remote location for setting.

11 Claims, 5 Drawing Figures

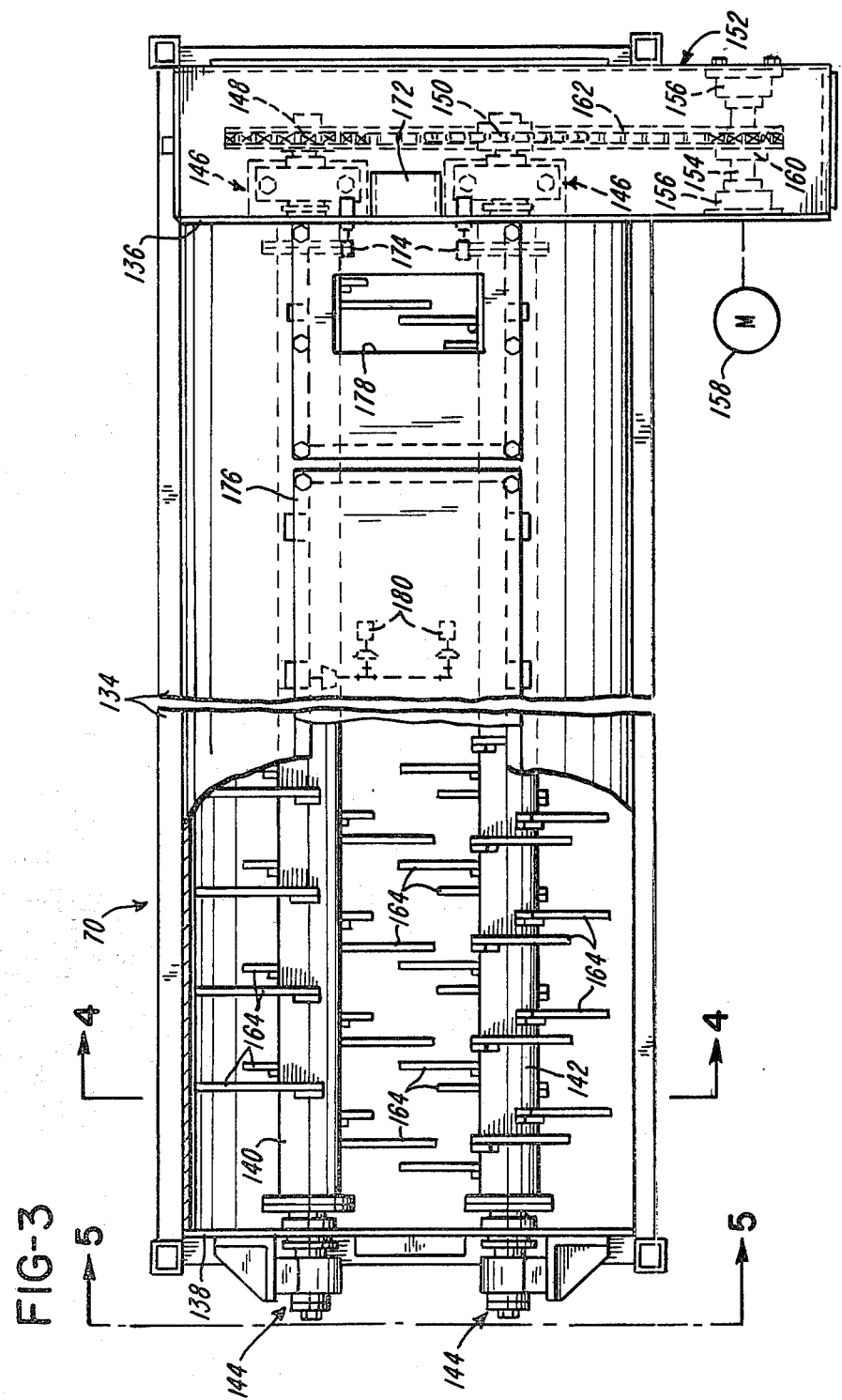

APPARATUS FOR TREATING LIQUID AND SEMI-SOLID ORGANIC WASTE MATERIALS

BACKGROUND OF THE INVENTION

The present invention relates to an apparatus and method for treating liquid and semi-solid organic waste materials prior to final disposal, whereby the wastes are made suitable for disposition in a landfill or the like.

Disposal of organic waste materials resulting particularly from sewage, but also from garbage, certain industrial wastes, and the like, has long been a significant problem. Numerous techniques for handling the wastes have been developed, typically involving placing the wastes in landfills. Such landfills have, however, resulted in pollution and health problems, as well as making the land so used unfit for other purposes. Many of the waste materials are physically or chemically unstable, and thus decompose under the influence of natural factors, with release of objectionable odors, and toxic or biologically harmful products which can enter into the contiguous water table. Moreover, experience has shown that even with the best landfill techniques there can also result insect, rodent and disease problems, and the potential for air pollution through refuse fires. Inevitable decomposition of non-permanent materials results in reduction of the volume of the material used as landfill with resultant subsidence of the filled land.

Thus, a waste treatment process is needed that renders the wastes non-polluting, solid, substantially insoluable in water, and chemically and physically stable. Such a process that meets these requirements is disclosed in U.S. Pat. No. 3,837,872, issued Sept. 24, 1974. The waste is mixed with an alkali metal silicate in the presence of a setting agent. The silicate and setting agent are used in proportions which cause the mixture to undergo consolidation and solidifcation and form a solid mass which is then used as the landfill material.

Of course, suitable apparatus for carrying out this process is required, including a means for mixing the waste with the silicate and setting agent.

One such apparatus is shown in U.S. Pat. No. 3,893,656, issued July 8, 1975. A mobile unit is disclosed for treating liquid waste such as is stored or deposited within a pond or lagoon. The apparatus, which is mounted on the bed of a trailer, includes a storage bin for holding a quantity of the setting agent and a hopper into which the liquid waste is pumped for combination with the setting agent. A shaft having a plurality of paddle-like blades is rotatably mounted in the hopper for mixing the waste and setting agent. The mixture is pumped from the hopper to the disposal site, and the silicate is introduced into the output line, mixed by the pumping of the material.

Such a device is advantageous in situations where the waste is generally well liquified and held in ponds containing moderate quantitites. In the case of sewage, however, as well as in many other situations, a device of this type often will not be usable. Where the sewage waste is processed directly as a sludge from a municipal waste water treatment facility, for example, the device will not have sufficient capacity to handle the quantity of waste material generated.

Various other mixing devices for differing applications are known. For example, in U.S. Pat. No. 4,281,934, issued Aug. 4, 1981, a mixer of the type also known as a pug mill is disclosed. A pair of counter-rotated mixing shafts are mounted in parallel longitudinally along a trough. A plurality of blades are mounted radially to each shaft, staggered by 90° around each shaft whereby the blades of each follow one another in helical succession. The mixer is designed for use with heavy materials, such as construction materials, and as the shafts are rotated, the material is both mixed and advanced along the trough to a discharge end.

Due to the typical characteristics of the organic waste material to be processed, such as sewage, however, either the mobile unit or the simple mixer discussed above for adding the silicate and setting agent to the waste is insufficient. In addition to the solid and liquid components of the waste, a significant amount of stringy and fibrous material is typically present. In known mixers of the type discussed above, the relatively square, radially-extending blades or paddles tend to be coated by such material, reducing the mixer's effectiveness, and requiring halting of the mixer for cleaning. In addition, the high viscosity of the waste material requires more than a mixer for combining the waste with the silicate and setting agent. An entire processing system is required to reduce the waste viscosity to a level that will permit adequate mixing, and allow sufficient throughput to make processing the waste practical.

What is needed, therefore, is an apparatus and method for producing a fertilizer from organic waste material. Such an apparatus and method should be operative to combine the waste material, carried in a sludge, with a silicate and a setting agent in manner that renders production of such a fertilizer both practical and economical.

SUMMARY OF THE INVENTION

The present invention includes an apparatus for treating liquid and semi-solid organic waste materials carried within a sludge, by adding to the sludge an alkali metal silicate and a setting agent. A first mixer, including a trough having an input end and a discharge end, has at least one rotatable shaft mounted longitudinally along the trough. A plurality of blades are mounted to the shaft and a means for rotating the shaft is provided. The waste material sludge is directed to the input end of the trough.

A tank is also provided, into which the sludge is directed after passing through the first mixer. A pump mounted within the tank lifts the tank contents therefrom, and includes a means for chopping the tank contents during pumping. A second mixer also includes a trough having an input end and a discharge end, at least one rotatable shaft mounted longitudinally along the trough, and a plurality of blades mounted to the shaft. The shaft is rotated, and the sludge from the pump is directed to the input end of the second mixer. Water is selectively introduced also at the input end, and the setting agent is introduced into the trough of the second mixer at a point substantially adjacent the input end. The alkali metal silicate is introduced into the trough at a point along the trough between the setting agent introduction point and the discharge end.

The apparatus may further include an additional pump mounted within the tank for lifting the contents of the tank therefrom, with the pump including a means for chopping the tank contents during pumping. The output of the pump is directed back into the tank.

The apparatus may include a further pump mounted within the tank for lifting the contents of the tank therefrom, including means for chopping the tank contents during pumping. A third mixer is provided including a trough having an input end and a discharge end, at least one rotatable shaft mounted longitudinally along the trough, and a plurality of blades mounted to the shaft. The shaft is driven for rotation. The output of the pump is directed to the input end of the third mixer, and the output of the third mixer is directed back into the tank.

The apparatus may further include means for delivering the setting agent and the silicate to their respective points of introduction into the second mixer, and means for determining and adjusting the rates of delivery of the setting agent and the silicate into the second mixer.

The apparatus may further include a control means responsive to the delivery rate of the silicate, setting agent, and sludge into the mixer, and operative to cause the adjustment of the rates accordingly.

The second mixer may include an elongated trough having an input end and a discharge end, and a pair of parallel rotatable shafts disposed lengthwise along the trough. The shafts are counter-rotated, with a plurality of blades mounted to each shaft. Each blade has a leading edge substantially defining a portion of the circumference of a circle, and a trailing edge substantially defining a chord of the circle, with the resulting surface area of each of the blades being less than half the area of the defined circle. Each blade is mounted at one end to one of the shafts such that the trailing edge is substantially tangent to the shaft.

The method of treating organic waste materials carried within a sludge includes the steps of mixing the sludge within a first mixer, and directing the sludge into a tank. The sludge is pumped through a pump operative to simultaneously chop the waste, and then is pumped into a second mixer. A setting agent is added to the sludge near the input end of the mixer, and an alkali metal silicate is introduced into the mixer at a point partially along the length thereof. The mixed material is then recovered from the mixer.

Accordingly, it is an object of the present invention to provide an apparatus and method for treating liquid and semi-solid organic waste materials carried within a sludge to facilitate disposal of the material; to provide such an apparatus and method that treats the waste material by adding an alkali metal silicate and a setting agent to the material; to provide such an apparatus and method that is capable of handling the waste material sludge without undue build-up of material within the apparatus; and to provide an apparatus and method that treats the waste in sufficient quantities to be both practical and economical.

Other objects and advantages of the present invention will be apparent from the following description, the accompanying drawings, and the appended claims.

BRIEF DESCRIPTION OF THE DRAWINGS

FIG. 3 is a top view of a mixing device used within the treatment device, showing a portion of the cover plate cut away;

DESCRIPTION OF THE PREFERRED EMBODIMENTS

As used herein, the term "organic waste" includes raw human wastes and sludges from various organic sources. The organic waste is preferably obtained from sewage, and is a mixture of "waste activated sludge", which is the activated sludge obtained from the aeration field of a waste water treatment facility, and "primary sludge" from the settling of solids as the waste water first enters the waste water treatment plant. The ratio of waste activated sludge to primary sludge is not critical.

The present invention is based upon the mixing of commercial or domestic wastes with a alkali metal silicate which, in the presence of a silicate setting agent, causes the mixture to undergo consolidation and solidification. Greater detail regarding this process may be found in U.S. Pat. No. 3,837,872, which is hereby incorporated by reference. Any alkali metal silicate can be used in the present invention, including sodium silicate and potassium silicate. Sodium silicate is preferred, because it is the least expensive and is generally available in the quantities required. The sodium silicate is used in its commercial liquid form.

A variety of setting agents may be used with the present inventon. Such setting agents are typified by such pozzolanic compounds as Portland cement, lime, gypsum, calcium carbonate, kiln dust, and fly ash, all of which have a quick gel action continuing with a hardening reaction over a period of time. The properties of Portland cement as a setting agent are excellent, and in addition, it is economical and readily available in large quantities. Also, the reaction rate with the silicate is easily controllable. Thus, the use of Portland cement as the setting agent is preferred.

Figure 1:
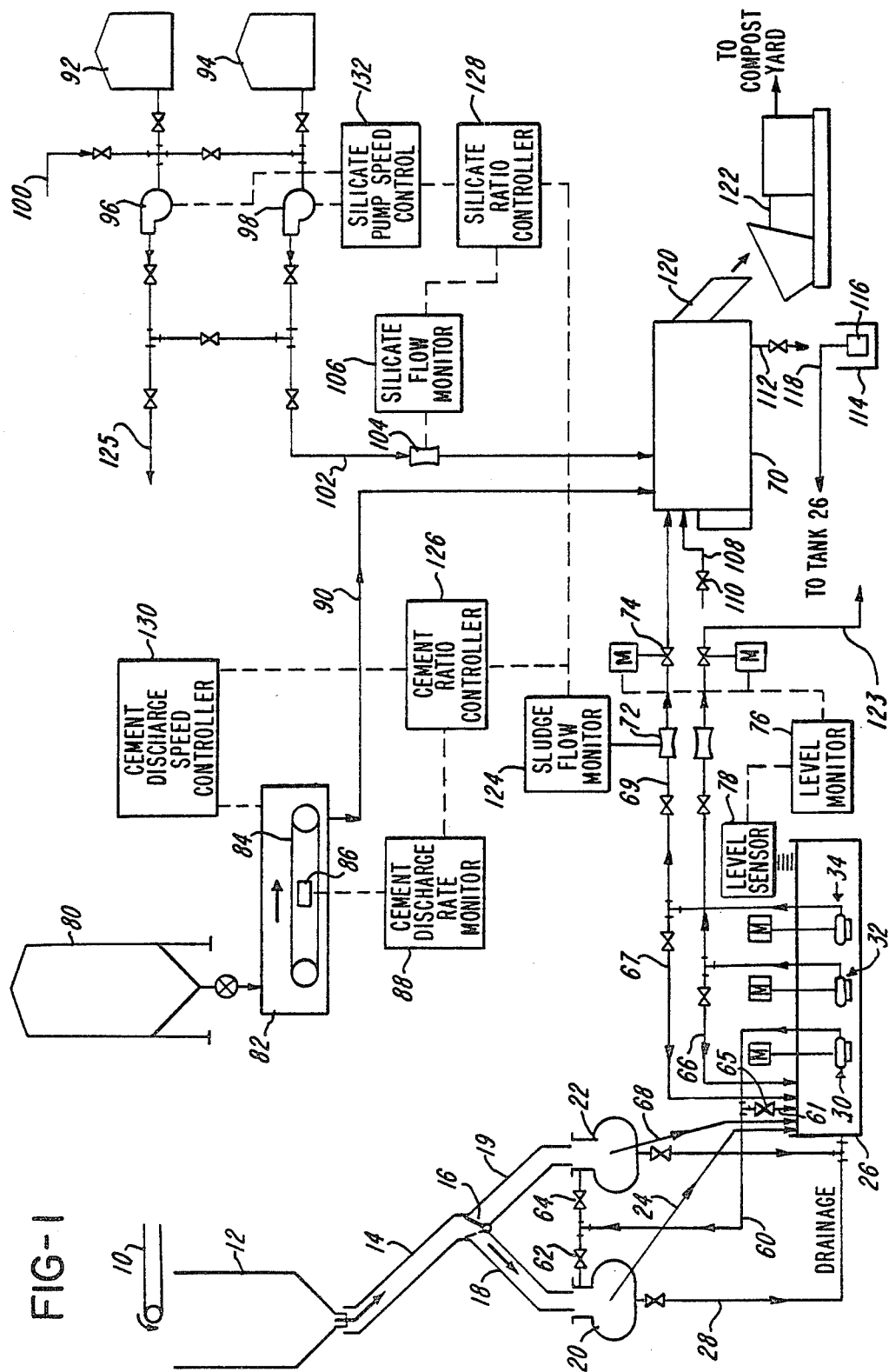
FIG. 1 is a schematic diagram showing the waste treatment apparatus of the present invention.

The apparatus for treating the organic waste is shown schematically in FIG. 1, from which the over-all scheme of the continuous sludge treating process can be ascertained. The waste material, in the form of a sludge, is carried into the system by a conveyor 10 or the like from a sewage treatment facility or other source. This sludge may typically be the cake output of a filter press or the like. Conveyor 10 deposits the sludge within a storage bin 12, from which the sludge can enter the apparatus at a relatively uniform rate. The sludge as deposited within bin 12 is a highly viscous, thixotrophic material. While the viscosity of the sludge is not uniform, averaqe viscosity is typically estimated at in the order of 100,000 centipoise.

The sludge exits the storage bin 12 through a chute 14 connected to the bottom of bin 12. A diverter 16 directs the sludge into either of two branch chutes 18 and 19, each of which empties into one of two mixers 20 and 22, respectively.

As will be described in greater detail below, mixers 20 and 22 each include a trough having an input end and a discharge end. Each trough further includes a pair of shafts mounted longitudinally along the trough, with a plurality of blades attached to each shaft. The shafts are counter-rotated, which both mixes the contents of the trough, and draws the contents from the input end to the discharge end.

As shown in FIG. 1, diverter 16 is positioned to direct the sludge from bin 12 into branch chute 18 and into the input end of mixer 20, which operates to decrease the sludge viscosity through mixing. Upon exiting mixer 20 at its discharge end, the sludge is directed by conduit 24 into a tank 26. In addition, a drainage line 28 is provided from mixer 20, so that any excess water released from the sludge during mixing may also be directed into tank 26.

Figure 2:
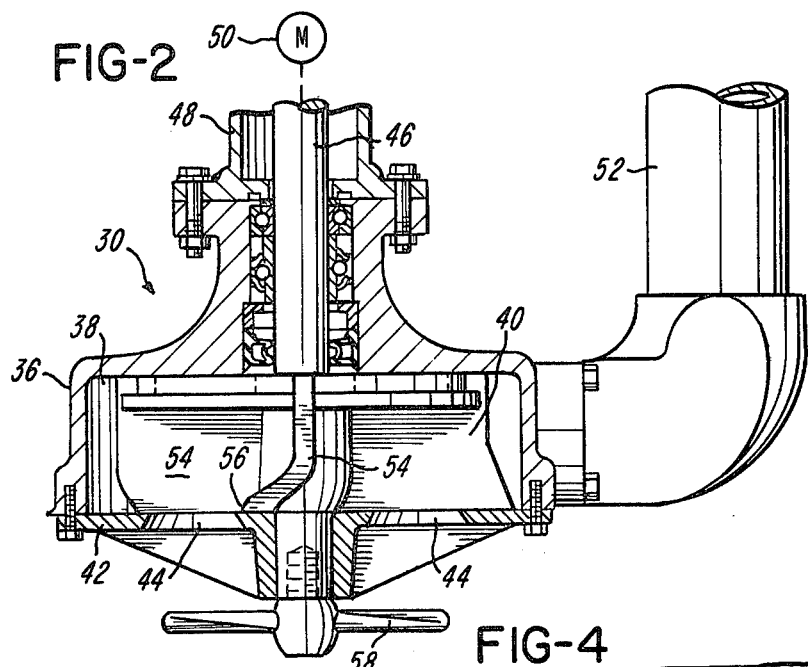
FIG. 2 is a sectional view of a chopper pump used within the treatment apparatus.

Three chopper pumps 30, 32, and 34 are mounted within tank 26 for pumping and simultaneously chopping the sludge contained within the tank 26, again for purposes of further lowering viscosity. Each of pumps 30, 32, and 34 are identical, with pump 30 being shown in greater detail in FIG. 2. A pump housing 36 provides a chamber 38 into which an impeller 40 is mounted. Lower cover plate 42, mounted to housing 36, includes a pair of inlet openings 44 through which the sludge to be pumped is drawn. Impeller 40 is mounted to a rotatable drive shaft 46, which extends upwardly through shaft housing 48 and is connected to motor 50. Energization of motor 50 causes the impeller 40 to draw the sludge through the input openings 44, into pumping chamber 38, and forces the sludge outwardly through output conduit 52. Impeller 40 includes a plurality of impeller vanes 54, each of which includes a leading chopper edge 56. In addition, shaft 46 extends slightly below impeller 40, and carries at the end thereof a disintegrator tool 58. Rotation of the tool 58 through the incoming sludge, as well as action of the chopper edqe 56 of each impeller vane 54, operates to masticate the sludge being drawn through pump 30. In addition, the pumping action of pump 30 operates to decrease the viscosity of the sludge.

Pump 30, as described above, is commercially available from Vaughan Co., Inc., Montesano, Wash., referred to as a Heavy Duty Chopper Pump.

Referring back to FIG. 1, the output of pump 30 is directed into a return conduit 60 which selectively directs the sludge into the input end of either mixer 20 or 22 or back into tank 26 through conduit 61. Direction of the sludge is performed by appropriately opening or closing valves 62, 64 or 65.

The output from pumps 32 and 34 may be selectively directed into conduits 66 and 67, respectively, by appropriate valves shown in FIG. 1. Conduits 66 and 67 return the pumped sludge directly back into tank 26.

The various alternate conduits connecting mixers 20 and 22 and tank 26 enable a variety of routings for the sludge. Normally, the sludge will be passed through mixer 20, into tank 26, and then will be pumped by pump 30. The sludge will be directed immediately back into tank 26 through return conduit 61, from which it will be pumped by either pump 32 or 34 out of tank 26. The purpose of mixers 20 and 22 and tank 26, however, is to insure that the sludge has been sufficiently liquified to enable proper mixing of the sludge with the silicate and setting agent. Accordingly, depending upon the initial quantity of solid or semi-solid material within the sludge, and the overall viscosity of the sludge, various alternative routings for the sludge may need to be used.

For example, mixer 22 will normally be used as a back-up for mixer 20. When necessary, however, sludge from tank 26 may be pumped by pump 30 through conduit 60, and directed into mixer 22. Upon exiting mixer 22 at the discharge end, the sludge is directed by conduit 68 back into tank 26. In any event, upon exiting the tank 26 for the final time, the sludge viscosity will have been reduced to an average estimated in the order of 500 centipoise.

The liquified sludge is removed from tank 26 for the final time by pump 34, and is directed along conduit 69 to the input end of mixer 70. An in-line flow measurement device 72 is located in conduit 69 for monitoring the flow of sludge through the conduit. In addition, a motorized valve 74 is provided in conduit 69, and is controlled for actuation by level monitor 76. Monitor 76 is in turn responsive to level sensor 78, which senses the level of the sludge within tank 26. In the event the sludge level becomes too low within tank 26, monitor 76 operates to close valve 74, preventing removal of sludge from tank 26. In the event the sludge level becomes too high, monitor 76 ascertains that valve 74 is open, and provides an alerting signal to the operator of the apparatus.

The mixer 70 is similar to mixers 20 and 22, and includes a trough having an input and a discharge end. A pair of counter-rotated shafts mounted longitudinally within the trough serve to both mix the contents and move them along the length of the trough. Within mixer 70, the waste material sludge is combined with the setting agent and the alkali metal silicate.

The setting agent is held prior to use within a silo 80 or other appropriate storage means. The setting agent is fed into a weigh feeder 82, including a conveyor belt 84 and a belt scale 86. A discharge rate monitor 88 is responsive to belt scale 86 for monitoring the rate at which the setting agent is fed into the system. The agent is then directed from weigh feeder 82 through conduit 90 into the mixer 70 at a point near the input end.

A pair of storage tanks 92 and 94 are provided for holding the silicate prior to use. A pair of pumps 96 and 98 are provided for delivering the contents of tanks 92 and 94, respectively, and are preferably of the rotary type such as those manufactured, for example, by the Viking Pump Division, Houdaille Industries, Inc., Cedar Falls, Iowa. The output conduits from tanks 92 and 94 are interconnected as illustrated in FIG. 1, to enable the silicate to be supplied to mixer 70 from either tank 92 or 94. In addition, a water inlet 100 is provided to facilitate flushing of the system.

Pumps 96 and 98 direct the silicate into a conduit 102 for delivery to mixer 70. An in-line flow measurement device 104 is located in conduit 102, coupled to a responsive silicate flow monitor 106. Conduit 102 delivers the silicate into mixer 70 at a point between the setting agent introduction point and the discharge end of mixer 70.

A water inlet line 108, including a valve 110, is provided into the input end of mixer 70. Water may be supplied through line 108, to insure adequate moisture for proper reaction of the setting agent. Additionally, a drainage line 112 is provided from mixer 70, so that any excessive moisture contained within the mixer trough may be drained into a sump 114. A pump 116 is mounted in sump 114 for carrying liquid collected therein back to tank 26 for recirculation.

The mixed materials are recovered from mixer 70 at its discharge end, and directed by a chute 120 into a positive displacement pump 122. Pump 122 may be any appropriate commercially available pump, such as those available from American Pecco Corporation, Millwood, N.Y. The pump 122 delivers the mixture to an appropriate area where the solidification reaction is allowed to proceed for a period of from four to six days. Once the reaction is complete, the treated waste is in the form of a friable material, ready for use as landfill, or to be broken or ground into small particles useful as fertilizer, or as a filler supplement to other products such as asphaltic type paving material.

A second mixer identical to mixer 70 may be added to the system shown in FIG. 1 in order to increase the processing capacity. In such a case, a second conduit 123 is connected to direct sludge output from pump 32 within tank 26 into the input of the second mixer. Silicate is supplied through a conduit 125 from tanks 92 and 94. Due to the quantity of setting agent required, however, a second independent silo is provided for supplying the mixer. It will be recognized, of course, that the various connections of the mixer inputs, the monitoring system (as will be described below), and the like associated with the second mixer will be identical to those shown for mixer 70 in FIG. 1.

The proportions of silicate and setting agent used must be adjusted for the particular waste sludge that is used to provide a solid, stable mass which can be readily disposed of. In most cases, the silicate is used in an amount of about 3 to 8 volumetric parts per 100 parts sludge, and the setting agent is used in an amount of about 5 to 20 parts by weight per 100 parts sludge.

One important factor in determining the amount of silicate and setting agent to be used is the percent solids content of the waste sludge. This can generally be determined by monitoring the rate of flow of the sludge through the conduit 69 between tank 26 and mixer 70. Typically, the lower the solids content of the waste, the less viscous the sludge will be, and the higher the flow rate through conduit 69. Thus, a sludge flow monitor 124 is provided, responsive to flow measuring device 72 located within conduit 69. The sludge flow monitor 124 is interconnected with a setting agent ratio controller 126 and a silicate ratio controller 128. Ratio controller 126 is further responsive to discharge rate monitor 88, and is operative to control the setting agent discharge speed controller 130 for varying the rate at which agent is fed into mixer 70. Similarly, silicate ratio controller 128 is responsive to both sludge flow monitor 124 and silicate flow monitor 106, and operates to control silicate pump speed control 132. Speed control 132 in turn controls pumps 96 and 98 for regulating the delivery rate of the silicate into mixer 70.

Controllers 126 and 128 may be adapted to control the proportions of silicate and setting agent automatically, or may be adapted for manual control by the operator of the apparatus. Additionally, appropriate indication devices (not shown) may be provided, for example on a main control panel or the like, to provide the operator of the device with visual indications of the various flow and delivery rates within the apparatus.

Under typical operating conditions, flow rate of sludge through conduit 69 will be on the order of 100 to 300 gallons per minute, flow rate of setting agent through conduit 90 on the order of 85 to 500 pounds per minute, and flow rate of silicate through conduit 102 on the order of 5 to 18 gallons per minute.

A top view showing the mixer 70 in detail is presented in FIG. 3. It will be recognized that mixers 20 and 22 are similar to mixer 70, although they do not include provisions for introducing cement, silicate or water, as is necessary in mixer 70.

Mixer 70 includes an elongated trough 134 which serves as a container for the materials to be mixed. An end wall 136 defines the input end of the trough 134, and an opposite end wall 138 defines the discharge end. A pair of rotatable shafts 140 and 142 are mounted longitudinally along the interior of trough 134. The end of each shaft 140 and 142 adjacent end wall 138 is supported in an appropriate bearing housing 144, mounted to the outer surface of end wall 138. Similarly, bearing housings 146 are mounted to the outer surface of end wall 136 for supporting the opposite ends of shafts 140 and 142. The ends of shafts 140 and 142 extend beyond bearing housings 146, and each shaft 140 and 142 has a driving gear 148 and 150, respectively, mounted at its end.

End wall 136 further defines one portion of a drive housing 152 mounted at one end of mixer 70. A drive shaft 154 is rotatably mounted within housing 152, supported at each entrance thereto by bearing housings 156. Drive shaft 154 is driven by a motor 158 through an appropriate speed reducer, so that shaft 154 is preferably driven at a speed of about 300 rpm. A gear 160 is mounted to shaft 154, and a drive chain 162 is passed about gear 160. Chain 162 passes along the bottom of gear 150, and then over the top and around gear 148, so rotation of drive shaft 154 causes chain 162 to counterrotate shafts 140 and 142. Gears 148, 150 and 160 are selected with a gear ratio between either gear 148 or 150 and gear 160 of 28 to 13, for a preferred rotational speed of shafts 140 and 142 of approximately 140 rpm.

Figure 4:
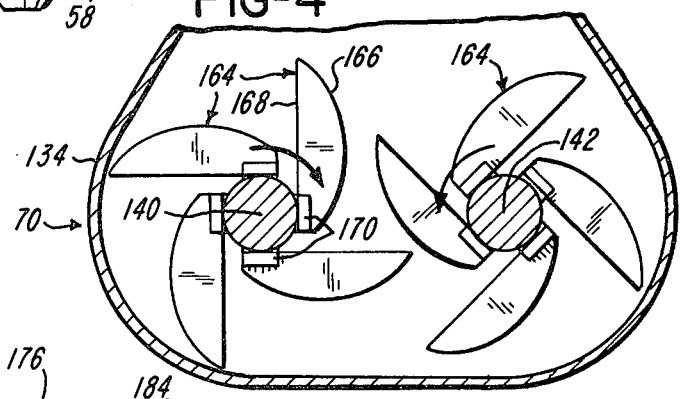
FIG. 4 is a view taken generally along line 4—4 of FIG. 3.

A plurality of blades 164 are mounted to each of shafts 140 and 142 for mixing the contents of trough 134 and drawing the contents along the length of the trough. As seen in FIGS. 3 and 4, the blades 164 are mounted sequentially along each shaft 140 and 142, with equal spacings both longitudinally and radially between succeeding blades 164. Each succeeding blade is displaced radially by 90° from the preceeding blade about the shaft to which it is mounted; thus, the blades effectively define a helical pattern along the length of each shaft.

The configuration of the individual blades 164 can best be seen by reference to FIG. 4. Each blade 164 includes a leading edge 166, which defines a portion of the circumference of a circle. The trailing edge 168 of blade 164 defines a chord of the circle, so that the area of the portion of the circle defined by blade 164 is less than half the area of the entire circle. A mounting block 170 is attached to one end of blade 164, preferably by welding. Blade 164 is thus secured to either shaft 140 or 142 by bolts (not shown) passing through mounting block 170 and into the shaft. When mounted to shaft 140 or 142, the trailing edge 168 of blade 164 defines a tangent to the cross-section of the shaft.

Referring back to FIG. 3, an input opening 172 is provided in the end wall 136 for introduction into the trough 134 of the waste material sludge. In addition, nozzles 174 are mounted through end wall 136 for connnection to the water inlet line 108 into mixer 70.

A cover plate 176 is mounted to the top of the trough 134. Near the end wall 136, an opening 178 is provided in cover plate 176 for introducing setting agent to trough 134. Additionally, a pair of silicate injection nozzles 180 are mounted to the underside of cover plate 176, at a point along trough 134 between opening 178 and discharge end wall 138. Thus, by the time the silicate is added to the mixure within trough 134, the setting agent and sludge have been relatively well combined.

Figure 5:
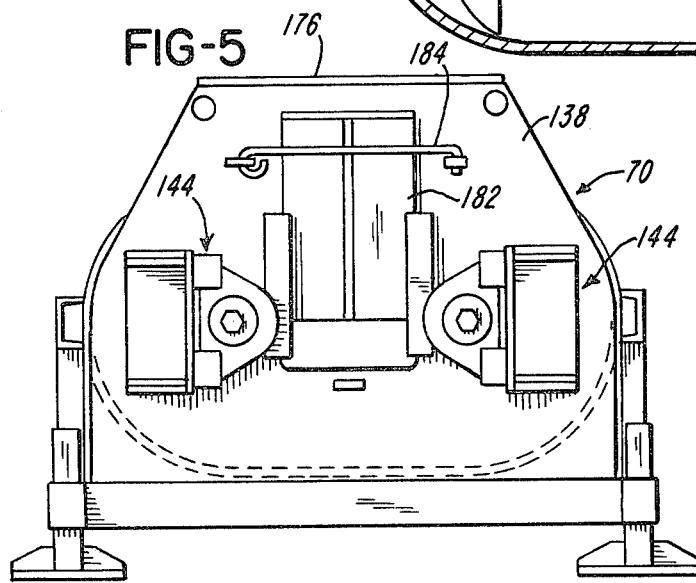
FIG. 5 is a view taken generally along line 5—5 of FIG. 3.

The outer surface of discharge end wall 138 is shown in FIG. 5. A discharge gate 182 is slidably mounted on end wall 138 for vertical movement. A latch 184 is provided, for retaining gate 182 in a vertical position. By positioning gate 182, the rate of discharge from the mixer 70 can be regulated, with, of course, the rate of discharge increasing as the gate 182 is opened to a greater degree. Thus, the discharge rate, as well as to some extent the residence time of the mixture within mixer 70, may be controlled.

While the method herein described, and the form of apparatus for carrying this method into effect, constitute preferred embodiments of this invention, it is to be understood that the invention is not limited to this precise method and form of apparatus, and that changes may be made in either without departing from the scope of the invention which is defined in the appended claims.

What is claimed is:

1. An apparatus for treating organic waste material carried within a sludge, by adding to the sludge an alkali metal silicate and a setting agent, said apparatus comprising:

means for mechanically working the sludge sufficient to reduce its viscosity substantially;

a first mixer including a first trough having an input and a discharge end, one rotatable first shaft mounted longitudinally along said trough, a plurality of blades mounted to said shaft, and means for rotating said first shaft;

means directing the sludge from said viscosity reduction means to said input end of said first mixer;

means for introducing the setting agent into said first trough at a first point substantially adjacent said input end;

means for introducing the alkali metal silicate into said first trough at a second point along said first trough between said first point and said discharge end;

a second mixer including a second trough having an input end and a discharge end, at least one rotatable second shaft mounted longitudinally along said second trough, a plurality of blades mounted to said second shaft, and means for rotating said second shaft;

means directing the sludge to said input end of said second trough;

a tank;

means directing the sludge from said discharge end of said second mixer into said tank; and a first pump mounted within said tank for lifting the sludge from said tank, said first pump including means for chopping the sludge during pumping.

2. The apparatus as defined in claim 1, further comprising means for introducing water into said first trough of said first mixer at said input end thereof.

3. The apparatus as defined in claim 1 wherein said means for directing the sludge to said input end of said second mixer includes a bin for holding a quantity of the sludge and a chute for carrying the sludge from said bin to said second mixer.

4. The apparatus as defined in claim 1, further comprising a second pump mounted within said tank for lifting the sludge from said tank, said second pump including means for chopping the sludge during pumping, and means for directing the sludge from said second pump back into said tank.

5. The apparatus as defined in claim 1, further comprising:

a second pump mounted within said tank for lifting the sludge from said tank, said second pump including means for chopping the sludge during pumping;

a third mixer including a third trough having an input end and a discharge end, at least one rotatable third shaft mounted longitudinally along said third trough, a plurality of blades mounted to said third shaft, and a means for rotating said third shaft;

means for directing the sludge from said second pump to the input end of said third mixer; and means for directing the sludge from said third mixer to said tank.

6. The apparatus as defined in claim 5, further comprising means for selectively alternatively directing the sludge from said second pump back into said tank.

7. The apparatus as defined in claim 1, further comprising means for delivering the setting agent to said setting agent introduction means, means for determining a rate of delivery of the setting agent to said setting agent introduction means, and means for selectively adjusting said rate of delivery of the setting agent.

8. The apparatus as defined in claim 1, further comprising means for delivering the alkali silicate to said alkali silicate introduction means, means for determining a rate of delivery of the alkali silicate to said silicate introduction means, and means for selectively adjusting said rate of delivery of the alkali silicate.

9. The apparatus as defined in claim 1, further comprising:

means for delivering the alkali silicate to said alkali silicate introduction means;

means for determining a rate of delivery of the alkali silicate to said silicate introduction means;

means for selectively adjusting said rate of delivery of the alkali silicate; and means responsive to said setting agent rate determining means and said silicate rate determining means for operating said setting agent rate adjusting means and said alkali silicate rate adjusting means.

10. The apparatus as defined in claim 1, further comprising means for collecting the sludge from said discharge end of said first mixer and directing the sludge to a predetermined location remote from said first mixer.

11. The apparatus as defined in claim 10, wherein said sludge collection and directing means includes a positive displacement pump.

* * * * *